(12) United States Patent
Ahn et al.

(10) Patent No.: US 11,496,428 B2
(45) Date of Patent: Nov. 8, 2022

(54) METHOD AND SYSTEM FOR SHARING CONTENT ON INSTANT MESSAGING APPLICATION

(71) Applicant: LINE Plus Corporation, Seongnam-si (KR)

(72) Inventors: Deokyong Ahn, Seongnam-si (KR); Hwan Kim, Seongnam-si (KR); Min Jeong Kim, Seongnam-si (KR); Jaehyun Lee, Seongnam-si (KR); Seongsu Kim, Seongnam-si (KR); Kyoung Min Kim, Seongnam-si (KR); Sanghyuk Suh, Seongnam-si (KR); Jeongrok Kim, Seongnam-si (KR); Tae Jeong Lee, Seongnam-si (KR); Jeong Hyeon Kwon, Seongnam-si (KR); Keumryong Kim, Seongnam-si (KR); Inah Kim, Seongnam-si (KR); Na Young Kim, Seongnam-si (KR); Jungjun Park, Seongnam-si (KR)

(73) Assignee: LINE PLUS CORPORATION, Gyeonggi-do (KR)

( * ) Notice: Subject to any disclaimer, the term of this patent is extended or adjusted under 35 U.S.C. 154(b) by 0 days.

(21) Appl. No.: 17/236,013

(22) Filed: Apr. 21, 2021

(65) Prior Publication Data
US 2021/0336912 A1 Oct. 28, 2021

(30) Foreign Application Priority Data
Apr. 22, 2020 (KR) .................. 10-2020-0048981

(51) Int. Cl.
*H04L 51/10* (2022.01)
*H04N 7/14* (2006.01)
(Continued)

(52) U.S. Cl.
CPC ............ *H04L 51/10* (2013.01); *H04L 67/306* (2013.01); *H04N 5/445* (2013.01); *H04N 7/147* (2013.01); *H04N 7/15* (2013.01)

(58) Field of Classification Search
CPC ......... H04L 12/58; H04L 51/04; H04L 29/08; H04N 7/14; H04N 7/15; H04N 5/445
(Continued)

(56) References Cited

U.S. PATENT DOCUMENTS

2006/0148512 A1* 7/2006 Ekholm ................ H04M 3/563
455/550.1
2008/0134052 A1* 6/2008 Davis ...................... H04L 51/12
715/744
(Continued)

*Primary Examiner* — Melur Ramakrishnaiah
(74) *Attorney, Agent, or Firm* — Harnss, Dickey & Pierce, P.L.C.

(57) ABSTRACT

A method for sharing content on an instant messaging application operating in a user terminal including determining whether content-to-be-shared for a chat room associated with a user account of the instant messaging application exists, outputting a share recommendation message for the user account through the chat room in response to a result of the determining indicating that the content-to-be-shared exists, receiving a response to the share recommendation message from the user account, and outputting the content-to-be-shared for the chat room based on the received response to the share recommendation message may be provided.

19 Claims, 11 Drawing Sheets

(51) Int. Cl.
*H04L 67/306* (2022.01)
*H04N 5/445* (2011.01)
*H04N 7/15* (2006.01)

(58) Field of Classification Search
USPC .............................. 348/14.01–14.16; 709/204
See application file for complete search history.

(56) References Cited

U.S. PATENT DOCUMENTS

| | | | |
|---|---|---|---|
| 2011/0197163 A1* | 8/2011 | Jegal | H04M 1/27475 |
| | | | 715/811 |
| 2013/0191506 A1* | 7/2013 | Polis | H04L 67/02 |
| | | | 709/217 |
| 2014/0250175 A1* | 9/2014 | Baldwin | H04W 4/08 |
| | | | 709/204 |
| 2017/0104699 A1* | 4/2017 | Szeto | H04L 41/5093 |
| 2020/0043185 A1* | 2/2020 | Siminoff | G06F 3/0482 |

* cited by examiner

METHOD AND SYSTEM FOR SHARING CONTENT ON INSTANT MESSAGING APPLICATION

CROSS-REFERENCE TO RELATED APPLICATION

This application claims priority under 35 U.S.C § 119 to Korean Patent Application No. 10-2020-0048981, filed in the Korean Intellectual Property Office on Apr. 22, 2020, the entire contents of which are hereby incorporated by reference.

BACKGROUND

Technical Field

The present disclosure relates to methods and/or systems for sharing content on an instant messaging application, and in particular, to methods and/or systems for sharing content, which include determining whether content-to-be-shared for a chat room associated with a user account of the instant messaging application exist or is present, and when determining that the content-to-be-shared exists, outputting a share recommendation message.

Description of Related Art

Along with the widespread distribution of mobile devices such as smartphones, or the like and the development of the Internet, instant messaging applications have been widely used, and users of these applications are enabled to share various contents naturally with each other in their daily lives. As the users encounter contents in various fields of daily life, the users may want to share the contents with their acquaintances and receive opinions of the acquaintances on the shared content in real time. Accordingly, users may transmit content they want to share to other users or acquaintances on the instant messaging application, and receive evaluations or opinions of the other users or the acquaintances on the content.

In a related instant messaging application, in order to share the content through a chat room, users have to directly load the content through the chat room and request to share the same. Accordingly, there is an inconvenience in that the users have to load the content-to-be-shared from outside the chat room and then request to share the same. Further, because the users have to directly find the content they want to share among various contents, it may take a considerable amount of time to share the content, and there may be limitations on the content that can be shared.

Further, when the content is shared through the chat room in the related instant messaging application, there is an inconvenience that users have to individually see the shared content and send text messages through the chat room or separately initiate a call in order to communicate their opinions on the shared content. Accordingly, the users of the related instant messaging application may have further inconvenience when presenting their opinion or evaluation on the shared content.

SUMMARY

In order to solve the problems mentioned above, the present disclosure provides methods, non-transitory computer-readable storage mediums storing instructions, and/or systems for sharing content.

According to some example embodiment, a method and a system for sharing content includes determining whether content-to-be-shared for a chat room associated with a user account of an instant messaging application exists, first outputting a share recommendation message for the user account through the chat room in response to a result of the determining indicating that the content-to-be-shared exists, receiving a response to the share recommendation message from the user account, and second outputting the content-to-be-shared for the chat room based on the received response to the share recommendation message.

The second outputting may include initiating a video call between a plurality of user accounts associated with the chat room through the chat room, based on the received response to the share recommendation message, and outputting the content-to-be-shared together with a screen for the video call.

The method and the system for sharing content may include, in the process of sharing content, outputting the share recommendation message in response to an operation by a user account such as user account entering, initiating a video call, receiving a video call, selecting a message, and the like in the chat room of the instant messaging application.

The method and the system for sharing content may include, in the process of sharing content, determining whether the content-to-be-shared exists based on activity information or the like associated with the user account in a content providing application associated with the instant messaging application.

The present disclosure may be implemented in various ways, including a method, a system, an apparatus, or a non-transitory computer-readable storage medium.

A method for sharing content through an instant messaging application operating in a user terminal according to an example embodiment includes first determining whether content-to-be-shared for a chat room associated with a user account of the instant messaging application exists, first outputting a share recommendation message for the user account through the chat room in response to a result of the first determining indicating that the content-to-be-shared exists, receiving a response to the share recommendation message from the user account, and second outputting the content-to-be-shared for the chat room based on the received response to the share recommendation message.

According to an example embodiment, the second outputting may include initiating a video call between a plurality of user accounts associated with the chat room through the chat room, and outputting the content-to-be-shared together with a screen for the video call.

According to an example embodiment, the first determining may include automatically determining whether the content-to-be-shared exists before entering the user account into the chat room, and the first outputting may include outputting the share recommendation message for the user account through the chat room in response to the user account entering the chat room and the result of the first determining indicating that the content-to-be-shared exists.

According to an example embodiment, the first outputting may include initiating a video call between a plurality of user accounts associated with the chat room through the chat room, and outputting the share recommendation message for the user account through the chat room, in response to the video call through the chat room being initiated and the result of the first determining indicating that the content-to-be-shared exists.

According to an example embodiment, the first outputting may include determining whether to receive a video call between a plurality of user accounts associated with the chat room through the chat room, and outputting the share recommendation message for the user account through the chat room in response to a result of the second determining indicating to receive the video call and the result of the first determining indicating that the content-to-be-shared exists.

According to an example embodiment, the first determining may include outputting a screen for a video call between a plurality of user accounts associated with the chat room through the chat room, and automatically determining whether the content-to-be-shared is generated during the video call through the chat room, and the first outputting may include outputting the share recommendation message indicating whether or not to share the generated content-to-be-shared on the screen for the video call in response to a result of the automatically determining indicating that the content-to-be-shared is generated.

According to an example embodiment, the first determining may include second determining whether link information associated with a shareable type of content in the user terminal exists, and the second outputting may include outputting the shareable type of content through the link information.

According to an example embodiment, the second determining may include third determining whether a URL address is stored in a clipboard of the user terminal, and determining whether the stored URL address is associated with video content in response to a result of the third determining indicating that the URL address is stored in the clipboard of the user terminal, and the second outputting may include outputting the video content through the stored URL address.

According to an example embodiment, the second determining may include determining whether link information associated with video content stored in the user terminal exists within a period of time, and the second outputting may include outputting the video content through the link information.

According to an example embodiment, the first determining may include determining whether video content stored in the user terminal exists within a period of time, and the second outputting may include outputting the video content.

According to an example embodiment, the first determining may include selecting, by the user account, one of contents displayed in the chat room, second determining whether the selected one of the contents is a shareable type of content, and the first may include outputting the share recommendation message for the user account through the chat room in response to a result of the second determining indicating that the selected content is the shareable type of content, and the second outputting may include outputting the selected content together with a screen for a video call between a plurality of user accounts included in the chat room.

According to an example embodiment, whether the first determining may be performed based on activity information associated with the user account in a content providing application associated with the instant messaging application.

According to an example embodiment, the first determining may include determining whether link information associated with video content is included in a message provided through the chat room.

According to an example embodiment, the first outputting may further include analyzing text information provided through the chat room to output the share recommendation message for the user account through the chat room.

According to an example embodiment, whether the first determining may be performed based on content provided through one or more chat rooms including at least some user accounts among a plurality of user accounts associated with the chat room, and the at least some user accounts may include the user account.

According to an example embodiment, the first determining may be performed based on content uploaded by one or more user accounts associated with at least some of a plurality of user accounts associated with the chat room in a social network application associated with the instant messaging application, and the at least some of the plurality of user accounts may include the user account.

According to an example embodiment, the receiving may include receiving an input to share the content-to-be-shared by the user account in the chat room, and sharing the content-to-be-shared with a plurality of user accounts associated with the chat room through the chat room.

There is provided a non-transitory computer-readable recording medium storing instructions that, when executed by a processor, cause a computer including the processor to implement the above described method.

According to an example embodiment, a system for sharing content may include a memory, and one or more processors connected to the memory and configured to execute computer readable instructions contained in the memory such that the one or more processors are further configured to determine whether content-to-be-shared for a chat room associated with a user account of an instant messaging application exists, output a share recommendation message for the user account through the chat room in response to a determination result indicating that the content-to-be-shared exists, receive a response to the share recommendation message from the user account, and output the content-to-be-shared for the chat room based on the received response to the share recommendation message.

According to an example embodiment, the one or more processors may be further configured to initiate a video call between a plurality of user accounts associated with the chat room through the chat room, based on the received response to the share recommendation message, and output the content-to-be-shared together with a screen for the video call.

According to some example embodiments of the present disclosure, in response to the determination result indicating that the content-to-be-shared exists, a share recommendation message may be output such that the user may consider the content as the content-to-be-shared, even when the content was not previously intended to be shared by the user. Accordingly, the range of the content-to-be-shared that the user wants to share through the chat room can be expanded.

According to some example embodiments of the present disclosure, because content can be shared simply in response to the share recommendation message by the user account, content can be easily shared without requiring a separate operation of the user. Under such a system, various contents can be quickly disseminated to a large number of users.

According to some example embodiments of the present disclosure, because the shared content is output to user terminals of a plurality of user accounts associated with the chat room of the instant messaging application, a plurality of users can watch the shared content together. Accordingly, because a plurality of users may watch the same part of the shared content, it may be helpful to share opinions or evaluate the shared content.

According to some example embodiments of the present disclosure, because a video call is initiated between a plurality of user accounts associated with the chat room of the instant messaging application, and the shared content may be output along with the screen for the video call to the user terminals of the plurality of user accounts, opinions or evaluations on the shared content can be shared in real time through the video call.

According to some example embodiments of the present disclosure, a share recommendation message may be output for not only the content directly stored or selected by the user, but also for the content for which the user expressed favor or the content that is expected to be of interest to the user. Accordingly, more various contents can be shared.

The effects of the present disclosure are not limited to those described above, and other effects that are not mentioned above can be clearly understood to those skilled in the art based on the description provided below.

BRIEF DESCRIPTION OF THE DRAWINGS

The above and other objects, features and advantages of the present disclosure will become more apparent to those of ordinary skill in the art by describing in detail some example embodiments thereof with reference to the accompanying drawing, in which.

DETAILED DESCRIPTION

Figure 1:
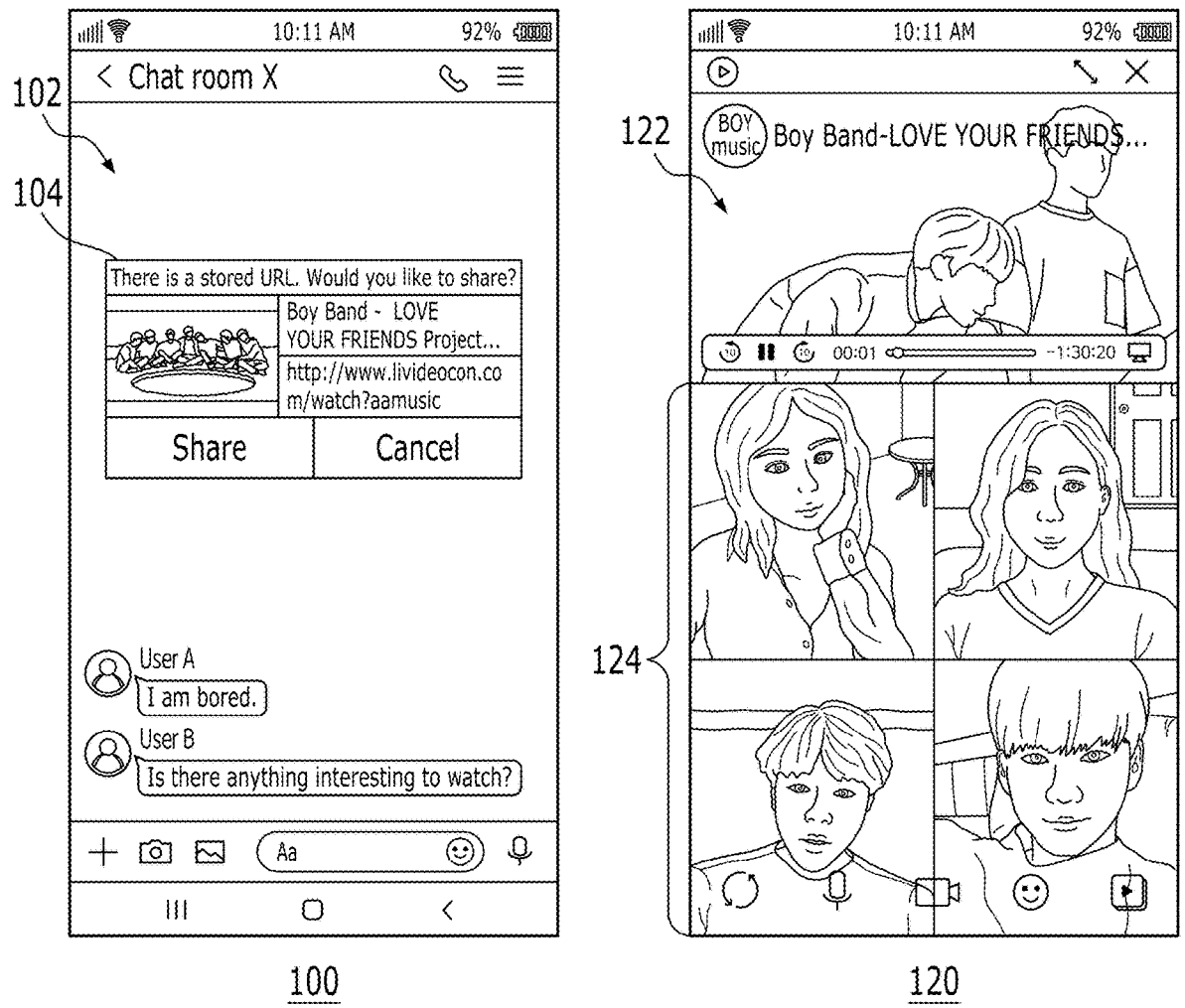
FIG. 1 is a diagram illustrating a method for sharing content on an instant messaging application operating in a user terminal according to an example embodiment.

Hereinafter, specific details for the practice of the present disclosure will be described in detail with reference to the accompanying drawings. However, in the following description, detailed descriptions of well-known functions or configurations will be omitted when it may make the subject matter of the present disclosure rather unclear.

In the accompanying drawings, the same or corresponding elements are assigned the same reference numerals. Further, in the following description of the example embodiments, duplicate descriptions of the same or corresponding components may be omitted. However, even if descriptions of components are omitted, it is not intended that such components are not included in any example embodiment.

Advantages and features of example embodiments and methods of accomplishing the same will be apparent by referring to the example embodiments described below in connection with the accompanying drawings. However, the present disclosure is not limited to the example embodiments disclosed below, and may be implemented in various different forms, and the present example embodiments are merely provided to make the present disclosure complete, and to fully disclose the scope of example embodiments to those skilled in the art to which the present disclosure pertains.

The terms used herein will be briefly described prior to describing the disclosed example embodiments in detail. The terms used herein have been selected as general terms which are widely used at present in consideration of the functions of the present disclosure, and this may be altered according to the intent of an operator skilled in the art, related practice, or introduction of new technology. Further, in a specific case, a term is arbitrarily selected by the applicant, and the meaning of the term will be described in detail in a corresponding description of the example embodiments. Therefore, the terms used in the present disclosure should be defined based on the meaning of the terms and the overall contents of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. As used throughout herein, when one part is referred to as "comprising" (or "including" or "having") other elements, the part can comprise (or include or have) only those elements or other elements as well as those elements unless specifically described otherwise.

It will be understood that, although the terms first, second, third etc. may be used herein to describe various operations, elements, components, regions, layers and/or sections, these operations, elements, components, regions, layers and/or sections should not be limited by these terms. These terms are only used to distinguish one operation, element, component, region, layer or section from another operation, element, component, region, layer or section. Thus, a first operation, element, component, region, layer or section discussed below could be termed a second operation, element, component, region, layer or section without departing from the teachings of example embodiments.

Further, the term "module" or "unit" used herein refers to a software, hardware component, or a combination thereof, and "module" or "unit" performs certain roles. However, the meaning of the "module" or "unit" is not limited to software or hardware. The "module" or "unit" may be configured to be in an addressable storage medium or configured to reproduce one or more processors. Accordingly, as an example, the "module" or "unit" may include components such as software components, object-oriented software components, class components, and task components, and at least one of processes, functions, attributes, procedures, subroutines, program code segments of program code, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

According to an example embodiment of the present disclosure, the "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination of processing devices, e.g., a combination of a DSP and a microprocessor, a plurality of microprocessors, one or more microprocessors in conjunction with a DSP core, or any other combination of such configurations. Further, the "memory" should be interpreted broadly to encompass any electronic component capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory that is integral to a processor is in electronic communication with the processor.

In the present disclosure, a "chat room" may refer to a virtual space or group, in which one or more users (or user accounts) may participate, and which may be generated in an instant messaging application installed on a computing device. For example, one or more user accounts may participate or be included in the chat room and exchange various types of messages, files, and the like. Further, in the chat room, a Voice over Internet Protocol (VoIP) call function, a VoIP group call function, and a live broadcast function (VoIP real-time video transmission function) are provided, so that voice calls, video calls, video streaming, and the like between user accounts in the chat room can be performed.

As used herein, the "user account" may represent an account generated and used by a user in the instant messaging application or data related thereto. Further, the user account of the instant messaging application may refer to a user who uses the instant messaging application. Likewise, a user who uses instant messaging or a chat room capable of instant messaging may refer to the user account of the instant application. Further, the user account may refer to a user account associated with the screen of the user terminal illustrated in the drawing. Further, a plurality of user accounts may be used separately from the user account, or may include the user accounts.

As used herein, the "content" may include various types of information or contents such as images, texts, videos, and voices that are produced digitally in such a manner that can be recognized by human senses and provided to the user. For example, the content may include video content, image content, audio content, text content, product content, movie content, food content, post content, and the like, but not limited thereto.

In the present disclosure, a "clipboard" may mean a memory area, a special storage device, or the like, which is specified for use as a temporary storage space in a computing device. For example, it may refer to a space in which the content is temporarily stored before being pasted or shared in the chat room of the instant messaging application, when the user account cuts, copies, or saves the content in or out of the chat room in the instant messaging application. That is, the clipboard can allow information to be transferred from one program to another program.

FIG. 1 is a diagram illustrating a method for sharing content on an instant messaging application operating in a user terminal according to an example embodiment. In this example, a plurality of user accounts may be associated with or participated in a chat room 102. As illustrated in operation 100 of FIG. 1, a plurality of user accounts are associated with a chat room X, that is, with a chat room 102, and may exchange text messages with each other through the chat room 102. Further, a video call may be performed between at least some user accounts among the plurality of user accounts associated with the chat room 102. In this example embodiment, the plurality of user accounts may include a user account (e.g., a user account A) associated with the screen of the user terminal illustrated in the first operation 100 A, a user account B, and a user account C. In an example, the first operation 100 may refer to executing the chat room 102 of the instant messaging application and displaying the same at the user terminal.

Whether a content-to-be-shared for the chat room associated with the user account of the instant messaging application exists (or is present) may be determined. In an example, the content-to-be-shared may include any type of content that may be shared through a chat room, and may include an image, a video, a post, or a URL connected thereto, for example, but not limited thereto. According to an example embodiment, the determination may be performed by the user terminal in which the instant messaging application associated with the user account is executed. For example, whether link information associated with a type of content that can be shared exists (or is present) may be determined, in the user terminal of the user account participating in the chat room 102. To this end, the user terminal may determine whether the URL stored in the clipboard, and when the URL address is stored in the clipboard, determine whether the stored URL address is associated with the video content. According to another example embodiment, whether a content-to-be-shared for the chat room 102 exists may be determined by a content sharing system that provides the instant messaging application. For example, based on the result of determination described above, the user terminal may receive the result of determination from the content sharing system, and determine whether a content-to-be-shared for the chat room 102 exists based on the received result.

When the result of the determination indicates that a content-to-be-shared exists, a share recommendation message may be output through the chat room. The share recommendation message may be displayed in any format that includes a response (e.g., one or more response options) as to whether to output or share the content-to-be-shared that is determined to be present in the user account through the chat room. For example, as illustrated in operation 100, a share recommendation message 104 may include an area corresponding to "Share" and an area corresponding to "Cancel". The share recommendation message 104 may be displayed in the same format as the user message in the chat room or may be displayed in a format different from the user message in the chat room, such as a system message, a notification message, a pop-up message, and so on. The share recommendation message 104 may be displayed at any location in the chat room or may be displayed as an overlay on the chat room screen. Further, the share recommendation message may include information indicating or characterizing the content-to-be-shared. For example, when it is determined that the URL is stored in the clipboard of the user terminal, the share recommendation message 104 including the stored URL (link information) and a thumbnail image of a video content linked to the URL, a title, and the like may be output through the chat room 102.

A response to the share recommendation message output from the user account may be received. According to an example embodiment, an input to share the content-to-be-shared may be received by the user account in the chat room. For example, as illustrated in operation 100, an input indicating selection of one of the area corresponding to "Share" or the area corresponding to "Cancel" included in the share recommendation message 104 may be received from the user account.

Based on the received response to the share recommendation message, the content-to-be-shared may be output through the chat room. According to an example embodiment, when the user account selects "Share" in response to the share recommendation message 104, as illustrated in the second operation 120, content-to-be-shared 122 may be displayed through the chat room 102 on the screen of the user terminal. To this end, when the user account selects (e.g., touch inputs) an area corresponding to "Share" in the share recommendation message 104, a screen of the video content 122 linked to the stored URL may be displayed in at least a part of the chat room 102 displayed on the screen of the user terminal, and the corresponding video content 122 may be played. Further, the screen of the video content 122 linked to the stored URL may also be output through user terminals of a plurality of user accounts associated with the chat room 102. That is, the content-to-be-shared 122 may be shared with each of a plurality of user accounts associated with the chat room 102.

Based on the response to the share recommendation message by the user account, a video call between a plurality of user accounts associated with the chat room may be initiated through the chat room. As soon as the video call is initiated, a video call screen may be displayed together with the content-to-be-shared. According to an example embodiment, when the user account selects "Share" in response to the share recommendation message 104, as illustrated in the second operation 120, a screen 124 for a video call may be displayed through the chat room 102 on the screen of the user terminal together with the content-to-be-shared 122. For example, when the user account selects (e.g., touch inputs) the area corresponding to "Share" in the share recommendation message 104, a video call may be initiated between user accounts (e.g., user account A, user account B, and user account C) that are selected to share content. In this case, the screen 124 for the video call may be output together with the video content 122 associated with the stored URL, and the screen 124 for the video call may be displayed on a lower part of the screen of the video content 122. In an example, the video call screen 124 may include a video or image captured through a photographing device of the user terminal associated with the user account participating in the video call. In this example embodiment, a video or image captured through the photographing device of the user terminal associated with the user accounts such as user account A, user account B, and user account C may be shared with, or output to a plurality of user accounts in the chat room through the video call screen 124. In FIG. 1, it is illustrated that the content-to-be-shared 122 is positioned on an upper part of the screen and the video call screen 124 is positioned on the lower part of the user terminal screen, but example embodiments are not limited thereto, and each of the content-to-be-shared 122 and the video call screen 124 may be output to be disposed in any position on the screen.

Figure 2:
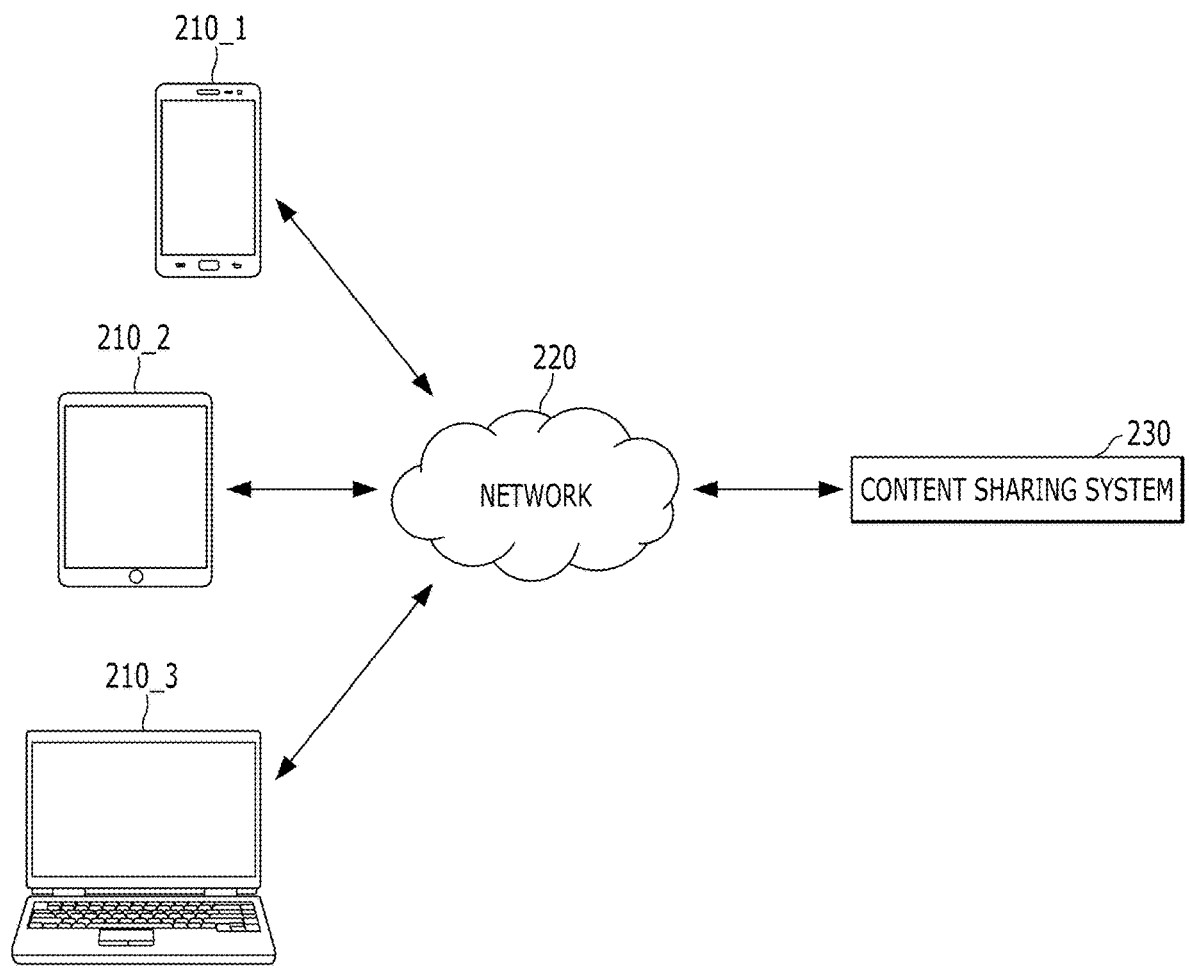
FIG. 2 is a schematic diagram illustrating a configuration in which a plurality of user terminals are communicatively connected with a content sharing system in order to provide a content sharing service according to an example embodiment.

FIG. 2 is a schematic diagram illustrating a configuration in which a plurality of user terminals 220_1, 220_2, 220_3 are connected to communicate with the content sharing system 230 in order to provide a content sharing service according to an example embodiment. The content sharing system 230 may include a system capable of providing an instant messaging service including a content sharing service to a plurality of user terminals 210_1, 210_2, 210_3 through the network 220. According to an example embodiment, the content sharing system 230 may include one or more server devices and/or databases capable of storing, providing and executing computer-executable programs (e.g., downloadable applications) and data associated with the instant messaging service, or one or more distributed computing devices and/or distributed databases based on cloud computing services. The instant messaging service provided by the content sharing system 230 may be provided to a user through the instant messaging application installed in each of the plurality of user terminals 210_1, 210_2, 210_3. For example, the instant messaging service may include a text messaging service, a video call service, a voice call service, a video streaming service, a screen sharing service, a content sharing service, and the like between users of the instant messaging application.

The plurality of user terminals 210_1, 210_2, 210_3 may communicate with the content sharing system 230 through the network 220. The network 220 may be configured to enable communication between the plurality of user terminals 210 and the content sharing system 230. The network 220 may be configured as a wired network 220 such as Ethernet, a wired home network (Power Line Communication), a telephone line communication device and RS-serial communication, a wireless network 220 such as a mobile communication network, a wireless LAN (WLAN), Wi-Fi, Bluetooth, and ZigBee, or a combination thereof, depending on the installation environment. The method of communication is not limited, and may include a communication method using a communication network (e.g., mobile communication network, wired Internet, wireless Internet, broadcasting network, satellite network, and the like) that may be included in the network 220 as well as short-range wireless communication between user terminals 210_1, 210_2 and 210_3. For example, the network 220 may include any one or more of networks including a personal area network (PAN), a local area network (LAN), a campus area network (CAN), a metropolitan area network (MAN), a wide area network (WAN), a broadband network (BBN), the Internet, and the like. In addition, the network 220 may include any one or more of network topologies including a bus network, a star network, a ring network, a mesh network, a star-bus network, a tree or hierarchical network, and the like, but not limited thereto.

In FIG. 2, a mobile phone terminal 210_1, a tablet terminal 210_2, and a PC terminal 210_3 are illustrated as the examples of the user terminals, but example embodiments are not limited thereto, and the user terminals 210_1, 210_2, 210_3 may be any computing device that is capable of wired and/or wireless communication and that can be installed with the instant messaging application and execute the same. For example, the user terminal may include a smart phone, a mobile phone, a navigation system, a computer, a notebook computer, a digital broadcasting terminal, Personal Digital Assistants (PDA), a Portable Multimedia Player (PMP), a tablet PC, a game console, a wearable device, an internet of things (IoT) device, a virtual reality (VR) device, an augmented reality (AR) device, and the like. Further, while FIG. 2 illustrates three user terminals 210_1, 210_2, 210_3 in communication with the content sharing system 230 through the network 220, the present disclosure is not limited thereto, and accordingly, a different number of user terminals 210_1, 210_2, 210_3 may be configured to be in communication with the content sharing system 230 through the network 220.

The content sharing system 230 may receive an input to share the content-to-be-shared by the user account in the chat room from the user terminals 210_1, 210_2, 210_3 on which the instant messaging application is operated. When the input to share the content-to-be-shared is received, the content sharing system 230 may provide the content sharing service and/or the video call service between the user terminals 210_1, 210_2, 210_3 on which the instant messaging application is operating.

According to an example embodiment, in order to provide the content sharing service, the content sharing system 230 may receive the content from the user terminals 210_1, 210_2, 210_3 that are configured to share the content, and transmit the received content to the user terminals 210_1, 210_2, 210_3 to share. In an example, the content-to-be-shared may include shareable type of content and/or link information associated with this content. For example, when an input to share the content-to-be-shared is received, the content sharing system 230 may receive the content-to-be-shared from a user terminal of a user account that intends to share the content, and transmit the received content-to-be-shared to the user terminals of a plurality of user accounts associated with the chat room. That is, the content-to-be-shared may be shared with a plurality of user accounts associated with the chat room through the chat room.

According to another example embodiment, the content sharing system 230 may share the content-to-be-shared through a Voice over Internet Protocol (VoIP) channel with the user terminals 210_1, 210_2, 210_3. To this end, the content sharing system 230 may receive metadata in the protocol of the VoIP channel generated according to a request to share the content-to-be-shared from the user terminal that requests sharing, based on the response of the user account to the share recommendation message. That is, the user terminal that requests sharing may generate metadata of a VoIP call packet including data corresponding to the request to share content.

The content sharing protocol for data exchange in the VoIP channel may be defined in advance according to the type of the content-to-be-shared. According to an example embodiment, the content sharing protocol may include an identifier indicating a content sharing function and metadata defined according to a type of content-to-be-shared. The start (e.g., set) and end (e.g., unset) for sharing content may be handled through events of the core. For example, when the type of content-to-be-shared corresponds to a content provider (e.g., video, and the like), an identifier of the content type, an identifier of the content-to-be-shared, a title, a thumbnail, a state of playback (e.g., playing, pause, and the like), a playback position, and the like may be included in the metadata of the VoIP channel packet. As another example, when the type of content-to-be-shared corresponds to a URL associated with the video, an identifier of the content type, URL information (link information), a state of playback of the video linked to the URL, a playback position, and the like may be included in the metadata of the VoIP channel packet. As still another example, when the type of the content-to-be-shared corresponds to a screen image displayed on the user terminal (that is, when the content-to-be-shared is shared through a screen sharing function (e.g., watch together function)), an identifier of the content type, data desired for sharing the screen image, and the like may be included in the metadata of the VoIP channel packet. Accordingly, the content sharing system 230 may receive information desired for synchronizing and playing the content-to-be-shared between a plurality of user accounts as the metadata of the VoIP channel packet.

According to still another example embodiment, to provide a video call service, the content sharing system 230 may receive voice, image, video, and the like input through input devices (e.g., imaging devices such as cameras and/or voice input devices such as microphones) from the user terminals (210_1, 210_2, 210_3) on which the instant messaging application is operating, and transmit it to the user terminal of the plurality of user accounts associated with the chat room.

Figure 3:
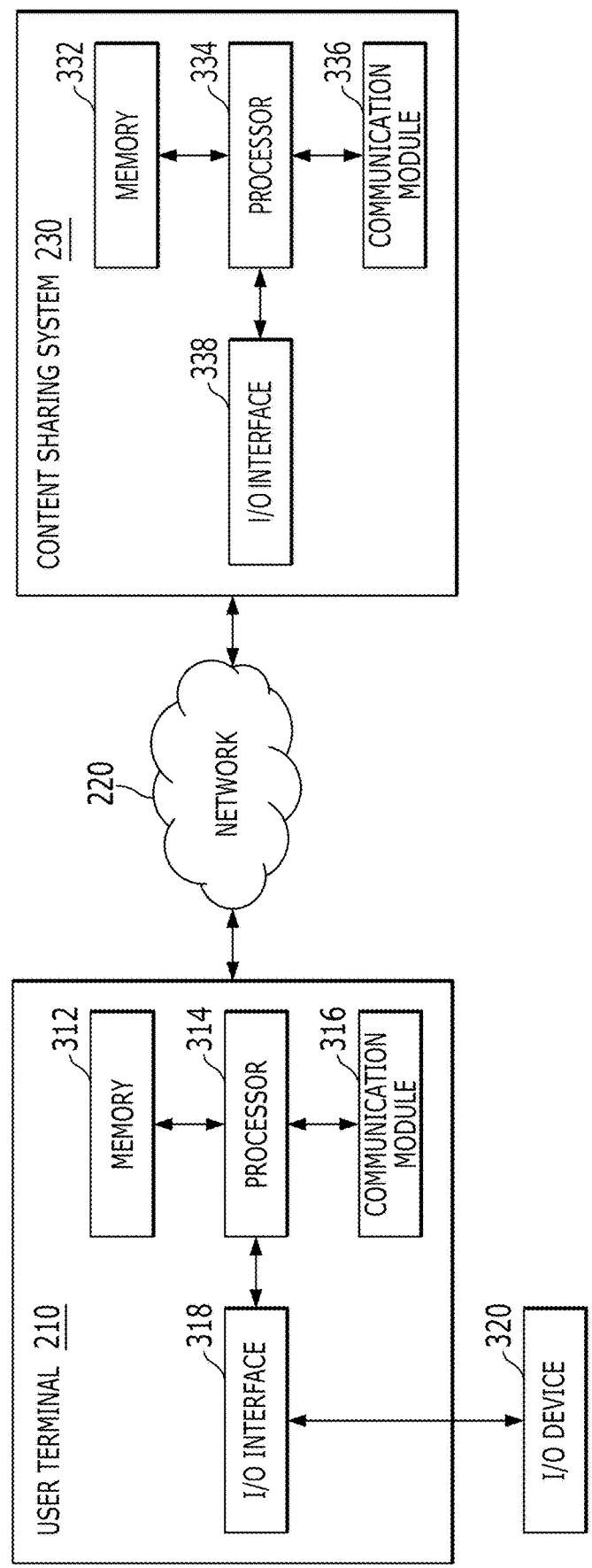
FIG. 3 is a block diagram illustrating internal configurations of a user terminal and a content sharing system according to an example embodiment.

FIG. 3 is a block diagram illustrating internal configurations of the user terminal 210 and the content sharing system 230 according to an example embodiment. The user terminal 210 may refer to any computing device that is capable of executing the instant messaging application and also capable of wired/wireless communication, and may include the mobile phone terminal 210_1, the tablet terminal 210_2, and the PC terminal 210_3 of FIG. 2, for example. As illustrated, the user terminal 210 may include a memory 312, a processor 314, a communication module 316, and an input and output interface 318. Likewise, the content sharing system 230 may include a memory 332, a processor 334, a communication module 336, and an input and output interface 338. As illustrated in FIG. 3, the user terminal 210 and the content sharing system 230 may be configured to communicate information and/or data through the network 220 using the respective communication modules 316, 336. Further, an input and output device 320 may be configured to input information and/or data to the user terminal 210 or to output information and/or data generated from the user terminal 210 through the input and output interface 318.

The memories 312, 332 may include any non-transitory computer-readable recording medium. According to an example embodiment, the memories 312, 332 may include a permanent mass storage device such as random access memory (RAM), read only memory (ROM), disk drive, solid state drive (SSD), flash memory, and so on. As another example, a non-destructive mass storage device such as ROM, SSD, flash memory, disk drive, and the like may be included in the user terminal 210 or the content sharing system 230 as a separate permanent storage device that is separate from the memory 312 or the memory 332. Further, an operating system and at least one program code (e.g., a code for the instant messaging application, and the like installed and driven in the user terminal 210) may be stored in the memories 312 and 332.

These software components may be loaded from a computer-readable recording medium separate from the memories 312, 332. Such a separate computer-readable recording medium may include a recording medium directly connectable to the user terminal 210 and the content sharing system 230, and may include a computer-readable recording medium such as a floppy drive, a disk, a tape, a DVD/CD-ROM drive, or a memory card. As another example, the software components may be loaded into the memories 312 and 332 through the communication modules rather than the computer-readable recording medium. For example, at least one program may be loaded into the memories 312 and 332 based on a computer program (e.g., an application that provides instant messaging application services) installed by files provided by the developers or a file distribution system for distributing an installation file of the application through the network 220.

The processors 314, 334 may be configured to process the instructions of the computer program by performing basic arithmetic, logic, and input and output operations. The instructions may be provided to the processors 314, 334 from the memories 312, 332 or the communication modules 316, 336. For example, the processors 314, 334 may be configured to execute the received instructions according to program code stored in a recording device such as the memories 312, 332.

The communication modules 316, 336 may provide a configuration or function for the user terminal 210 and the content sharing system 230 to communicate with each other through the network 220, and may provide a configuration or function for the user terminal 210 and/or the content sharing system 230 to communicate with another user terminal or another system (e.g., a separate cloud system, a separate content sharing system, a content providing system, or a separate video call system) For example, a request (e.g., a request to share content, a request to initiate video call) generated by the processor 314 of the user terminal 210 according to the program code stored in the recording device such as the memory 312 or the like may be transmitted to the content sharing system 230 through the network 220 under the control of the communication module 316. Conversely, a control signal or instructions provided under the control of the processor 334 of the content sharing system 230 may be received by the user terminal 210 through the communication module 316 of the user terminal 210 via the communication module 336 and the network 220. For example, the user terminal 210 may receive a result of determining whether the content-to-be-shared exists from the content sharing system 230 through the communication module 316. In the example embodiment, the communication modules 316 and 336 are provided separately from the processors 314 and 334, respectively. However, example embodiments are not limited thereto. In some example embodiments, the communication modules 316 and 336 may be included in the processors 314 and 334, respectively.

The input and output interface 318 may be a means for interfacing with the input and output device 320. As an example, the input device may include a device such as a camera including an image sensor, a keyboard, a microphone, a mouse, and so on, and the output device may include a device such as a display, a speaker, a haptic feedback device, and so on. As another example, the input and output interface 318 may be a means for interfacing with a device, such as, for example, a touch screen or the like that integrates a configuration or function for performing inputting and outputting. For example, when the processor 314 of the user terminal 210 processes the instructions of the computer program loaded in the memory 312, a service screen or content, which is configured with the information and/or data provided by the content sharing system 230 or other user terminals 210, may be displayed on the display through the input and output interface 318. While FIG. 3 illustrates that the input and output device 320 is not included in the user terminal 210, example embodiments are not limited thereto, and the input and output device 320 may be configured as one device with the user terminal 210. Further, the input and output interface 338 of the content sharing system 230 may be a means for interfacing with a device (not illustrated) for inputting or outputting. The input and output interface 338 of the content sharing system 230 may be connected to, or included in the content sharing system 230. In FIG. 3, the input and output interfaces 318, 338 are illustrated as the components configured separately from the processors 314, 334, but example embodiments are not limited thereto, and the input and output interfaces 318, 338 may be configured to be included in the processors 314, 334.

The user terminal 210 and the content sharing system 230 may include more components than those illustrated in FIG. 3. Meanwhile, it would be unnecessary to exactly illustrate most of the related components. According to an example embodiment, the user terminal 210 may be implemented to include at least a part of the input and output devices 320 described above. Further, the user terminal 210 may further include other components such as a transceiver, a global positioning system (GPS) module, a camera, various sensors, or a database. For example, when the user terminal 210 is a smartphone, it may generally include components included in the smartphone, and for example, it may be implemented such that various components such as an acceleration sensor, a gyro sensor, a camera module, various physical buttons, buttons using a touch panel, input and output ports, and/or a vibrator for vibration are further included in the user terminal 210.

According to an example embodiment, the processor 314 of the user terminal 210 may be configured to operate the instant messaging application or web browser application providing the instant messaging service including the content sharing service. In this case, a program code associated with the application may be loaded into the memory 312 of the user terminal 210. While the application is running, the processor 314 of the user terminal 210 may receive information and/or data provided from the input and output device 320 through the input and output interface 318 or receive information and/or data from the content sharing system 230 through the communication module 316, and process the received information and/or data and store them in the memory 312. Further, such information and/or data may be provided to the content sharing system 230 through the communication module 316.

While the instant messaging application is running, the processor 314 may receive texts, images, and the like, which may be inputted or selected through the input device 320 such as a touch screen or a keyboard connected to the input and output interface 318, and store the received texts, and/or images in the memory 312 or provide them to the content sharing system 230 through the communication module 316 and the network 220. For example, the processor 314 may receive information on the request to share content, a request to initiate a video call, and the like, through an input device such as a touch screen or a keyboard. Accordingly, the received request and/or information may be provided to the content sharing system 230 through the communication module 316 and the network 220.

The processor 314 may be configured to enter the user account into the chat room according to a request of the user account. According to an example embodiment, the configuration of entering the user account into the chat room may refer to a configuration of executing and/or displaying a selected chat room on the user terminal in response to an input to select the chat room that is already associated with the user account. In another example embodiment, the configuration of entering the user account into the chat room may refer to a configuration of the user account generating a chat room with one or more other user accounts in the instant messaging application, and executing and/or displaying the generated chat room.

The processor 314 may receive, through the input device 320 and the input and output interface 318, an input to initiate a video call between at least some user accounts among a plurality of user accounts associated with the chat room, or an input to determine whether to receive a video call. For example, such an input may refer to a touch input for an icon associated with a video call, but example embodiments are not limited thereto.

The processor 314 may receive an input to select one of the contents displayed in the chat room through the input device 320 and the input and output interface 318. In an example, the input indicative of selecting may include any motion of selecting one of the contents displayed in the chat room. For example, it may include a touch input for an area corresponding to the content, but example embodiments are not limited thereto.

The processor 314 may receive, through the input device 320 and the input and output interface 318, a response to the share recommendation message output through the chat room of the instant messaging application. According to an example embodiment, the processor 314 may receive, through the input device 320 and the input and output interface 318, an input to share the content-to-be-shared by the user account in the chat room. For example, a touch and click input or the like may be received for any area configured to execute instructions to share the content-to-be-shared. In response to this input, the processor 314 may provide the content-to-be-shared to the content sharing system 230 through the communication module 316.

The processor 314 may determine whether content-to-be-shared for the chat room associated with the user account of the instant messaging application exists. According to an example embodiment, the processor 314 may automatically determine whether the content-to-be-shared exists, before entering the user account into the chat room. That is, the processor 314 may determine whether the content-to-be-shared exists without a separate request from the user account. For example, the processor 314 may automatically determine whether the content-to-be-shared exists, before executing one chat room that is selected through the input to select one of a plurality of chat rooms already associated with the user account. As another example, the processor 314 may automatically determine whether the content-to-be-shared exists, before the user account is newly associated with or participates in the chat room not associated with the user account. According to another example embodiment, the processor 314 may automatically determine whether the content-to-be-shared is generated during a video call through the chat room between a plurality of user accounts associated with the chat room. According to still another example embodiment, the processor 314 may determine whether link information associated with video content included in a message provided through the chat room exists. For example, the processor 314 may determine whether the video content is the content-to-be-shared, by analyzing text information provided through the chat room.

The processor 314 may determine whether the content-to-be-shared in the memory 312 of the user terminal exists. According to an example embodiment, when a shareable type of content stored in the user terminal exists within a desired (or alternatively, predetermined) period of time, the processor 314 may determine such content as the content-to-be-shared. In this example, the content-to-be-shared may include the content and/or the link information associated with the content. For example, the processor 314 may determine whether video content that is streaming or is stored temporarily or permanently in the user terminal and/or link information associated with such content exist.

The processor 314 may determine whether the content-to-be-shared for the chat room associated with the user account of the instant messaging application exists, based on the input received through the input device 320. According to an example embodiment, the processor 314 may receive an input by the user account to select one of the contents displayed in the chat room, and determine whether the selected content is a shareable type of content. For example, it may be determined whether the selected content corresponds to the video or the video link information.

The processor 334 of the content sharing system 230 may be configured to manage, process, and/or store the information and/or data received from a plurality of user terminals including the user terminal 210 and/or a plurality of external systems. The information and/or data processed by the processor 334 may be provided to the user terminal 210 through the communication module 336. For example, the processor 334 may provide the user terminal 210 through the communication module 336 with presence or absence of the content-to-be-shared or information to determine whether the content-to-be-shared exists. According to an example embodiment, the processor 334 may share the content-to-be-shared with a plurality of user accounts associated with the chat room, in response to the request to share the content-to-be-shared by the user account in the chat room.

The processor 334 may determine whether the content-to-be-shared for the chat room associated with the user account of the instant messaging application exists, based on the activity information associated with the user account. According to an example embodiment, the processor 334 may collect the activity information associated with the user account in a content providing application associated with the instant messaging application. Further, the content providing application may include an application or website configured to provide any content, and may refer to a social network application, a shopping application, a content storage application, a personal blog, and the like, for example, but example embodiments are not limited thereto. For example, the processor 334 may provide not only the instant messaging service but also the content providing service, and may collect the activity information of the user account in the content providing application. Further, the activity information associated with the user account may refer to information on any activity performed by the user account in the content providing application, and may include information as to the user account expressing emotion in favor for certain content (e.g., indicated "like" or "favorite" for the content), content shared by the user account, content stored by the user account, and the like, for example, but example embodiments are not limited thereto.

According to another example embodiment, the processor 334 may collect the content provided through one or more chat rooms including at least some user accounts among a plurality of user accounts associated with the chat room, and determine whether the content-to-be-shared exists based on the collected content. For example, when there are five user accounts included in the first chat room and three of these user accounts are included in the second chat room, the processor 334 may collect the content that has been shared in the second chat room, and determine whether the content is the content-to-be-shared for the first chat room.

According to still another example embodiment, the processor 334 may determine whether the content-to-be-shared exists based on the content uploaded by one or more user accounts associated together with at least some of a plurality of user accounts associated with the chat room in a social network application associated with the instant messaging application. Further, the one or more user accounts associated together with each other may include friends, followers, and the like with which at least some of the plurality of user accounts are linked together on the social network. Further, whether the content-to-be-shared exists may be determined for one or more user accounts associated together with each other.

As described above, the processor 334 may collect various information associated with the user account, and determine whether the content-to-be-shared exists for the chat room associated with the user account through any rule-based recommendation method and/or artificial neural network-based recommendation method. According to an example embodiment, when it is determined that the content-to-be-shared exists, the processor 334 may provide the presence or absence of the content-to-be-shared and/or the content-to-be-shared to the user terminal 210 through the communication module 336. Accordingly, the processor 314 of the user terminal 210 may determine whether the content-to-be-shared exists, based on the presence or absence of the content-to-be-shared and/or the content-to-be-shared received from the content sharing system 230.

The processor 314 may be configured to output the processed information and/or data through an output device such as a device (e.g., a touch screen or a display) capable of outputting a display of the user terminal 210 or a device (e.g., a speaker) capable of outputting an audio. According to an example embodiment, information and/or data for the instant messaging service and the content sharing service may be displayed through a device capable of outputting a display, or the like. For example, the processor 314 may output a share recommendation message for the content-to-be-shared through the display of the user terminal 210. As another example, the processor 314 may output a screen for the content-to-be-shared and/or for a video call, through the display of the user terminal 210. According to another example embodiment, the information and/or data provided by the instant messaging application or web browser application may be output through the device capable of outputting an audio, or the like. For example, the processor 314 may output audio for the content-to-be-shared and/or for the video call, through a speaker of the user terminal 210.

When it is determined that the content-to-be-shared exists, the processor 314 may output through the chat room a share recommendation message for the user account. According to an example embodiment, when a video call is initiated through the chat room and it is determined that the content-to-be-shared exists, the processor 314 may output the share recommendation message for the user account through the chat room. For example, when it is determined that the content-to-be-shared exists as soon as an input to initiate a video call is received through the input device, the processor 314 may output the share recommendation message for the user account through the chat room. As another example, when sending a video call is performed with the input to initiate a video call and it is determined that the content-to-be-shared exists, the processor 314 may output the share recommendation message for the user account through the chat room. As still another example, when at least some of the plurality of user accounts receive a video call and it is determined that the content-to-be-shared exists, the processor 314 may output the share recommendation message for the user account through the chat room.

According to another example embodiment, when it is determined to receive a video call between a plurality of user accounts associated with the chat room through the chat room and it is determined that the content-to-be-shared exists, the processor 314 may output the share recommendation message. For example, when receiving an input to determine whether to receive a video call through the input device, and when it is determined that the content-to-be-shared exists, the processor 314 may output a share recommendation message for the user account through the chat room before outputting a screen for the video call. As another example, when outputting a screen for the video call with the input to receive a video call, and when it is determined that the content-to-be-shared exists, the processor 314 may output a share recommendation message for the user account through the chat room.

According to still another example embodiment, when it is determined that the content-to-be-shared is generated during a video call through the chat room, the processor 314 may output a share recommendation message indicating whether to share the generated content-to-be-shared for the screen for the video call. According to still another example embodiment, when it is determined that the content selected by the user account among the contents displayed in the chat room is a shareable type of content, the processor 314 may output a share recommendation message for the user account through the chat room. For example, the processor 314 may output a share recommendation message when the selected content corresponds to video or video link information. According to still another example embodiment, when it is determined that the link information associated with the video content is included in the message provided through the chat room, the processor 314 may analyze text information provided through the chat room and output a share recommendation message for the user account through the chat room.

The processor 314 may output the content-to-be-shared based on the response of the user account to the share recommendation message. According to an example embodiment, according to the response of the user account to the share recommendation message, link information associated with the content-to-be-shared may be provided to the content sharing system through the communication module 316, and the content providing system may share the content-to-be-shared with a plurality of user accounts in the chat room through the link information.

In another example embodiment, the processor 314 may share a screen image displayed on the user terminal with other user accounts in the chat room based on the response to the share recommendation message. In this case, when the share recommendation message is selected, an icon for sharing the screen image displayed by the user (for example, a "watch together" icon) may be displayed, and when the user selects such an icon, the content-to-be-shared may be shared. According to still another example embodiment, the processor may initiate a video call between a plurality of user accounts associated with the chat room through the chat room, based on a response to the share recommendation message, and may output the content-to-be-shared together with the screen for the video call.

Figure 4:
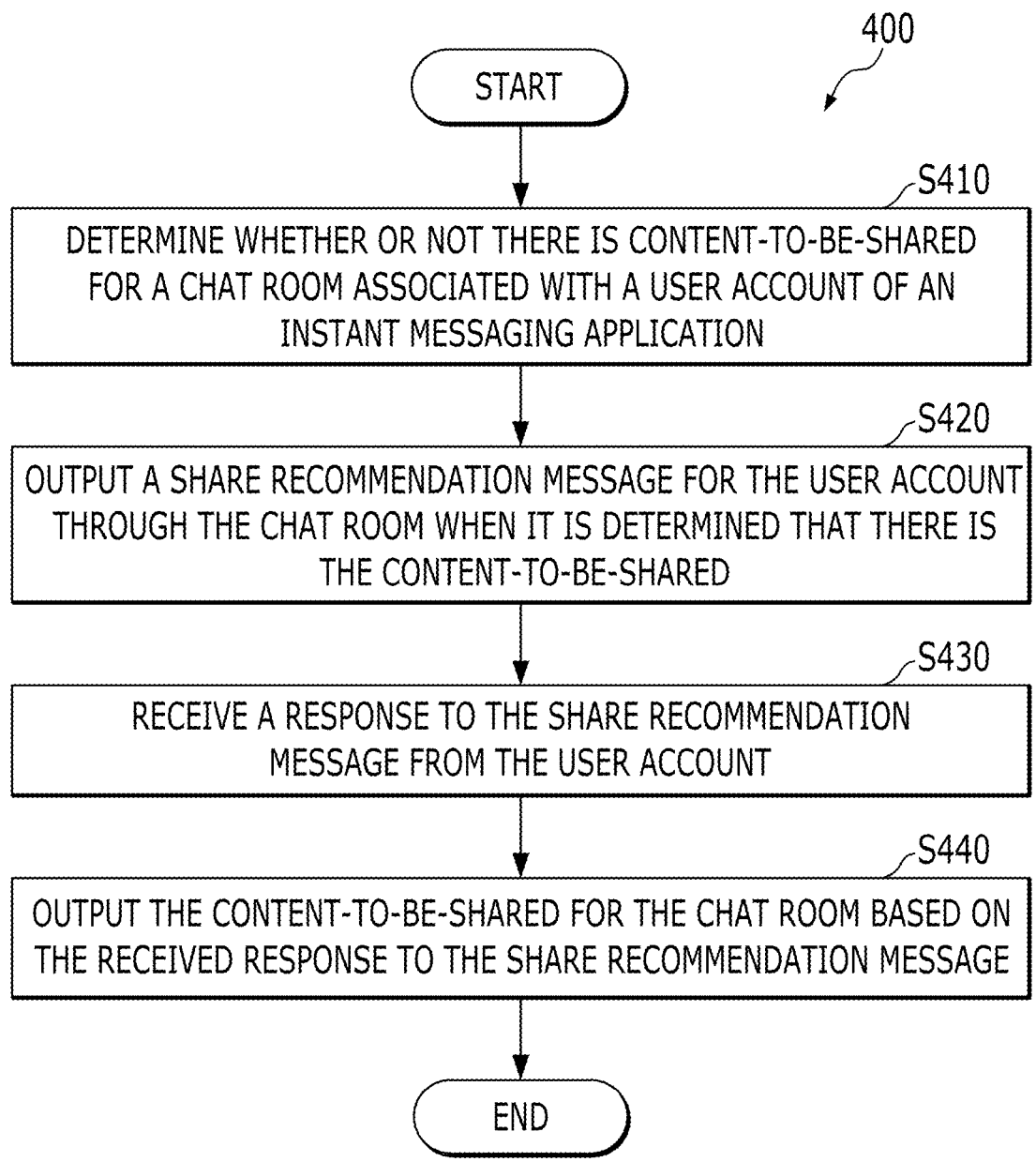
FIG. 4 is a flowchart illustrating a method for sharing content on an instant messaging application according to an example embodiment.

FIG. 4 is a flowchart illustrating a method 400 for sharing content on an instant messaging application according to an example embodiment. The content sharing method 400 may be performed by the user terminal and/or the content sharing system. As illustrated, the content sharing method 400 may be initiated at S410 of determining whether the content-to-be-shared for the chat room associated with the user account of the instant messaging application exists (or is present). For example, it may be determined whether shareable type of content exists in the chat room associated with the user account. As still another example, information associated with the user account may be analyzed to determine whether content determined that the user account wants to share exists (or is present).

Then, at S420, when it is determined that the content-to-be-shared exists, a share recommendation message for the user account may be output through the chat room. Further, the share recommendation message may be output through the chat room displayed on the user terminal, on which the user account of the instant messaging application is operating. Further, the share recommendation message may include any area configured to execute instructions that cause the user account to share the content-to-be-shared and/or any information indicating or characterizing the content-to-be-shared.

Next, at S430, a response to the share recommendation message may be received from the user account. According to an example embodiment, the user terminal may receive an input to share the content-to-be-shared by the user account. The response by such user account may be provided to the content sharing system.

Finally, at S440, based on the response to the received share recommendation message, the content-to-be-shared may be output through the chat room. According to an example embodiment, the content sharing system may provide the content-to-be-shared to the user terminal, on which a plurality of user accounts included in the chat room are operating. The provided content-to-be-shared may be included in the user terminal or output through a connected output device. For example, the content-to-be-shared may be output not only to the user terminal on which the user account of the chat room is operating, but also to the user terminals on which other user accounts are operating, thereby sharing the content-to-be-shared with a plurality of user accounts in the chat room.

Figure 5:
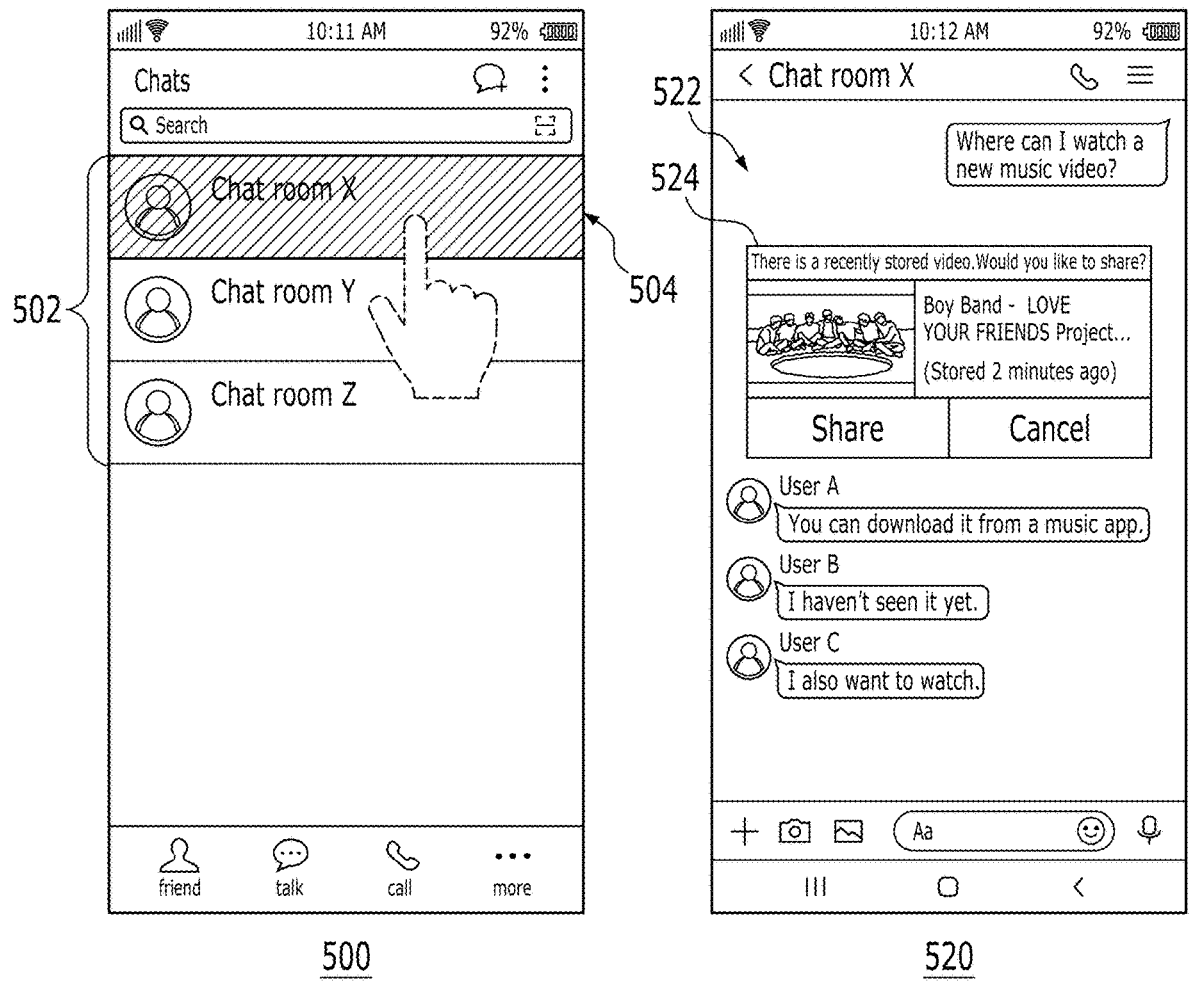
FIG. 5 is a diagram illustrating an operation of a process of sharing content on an instant messaging application operating in a user terminal according to an example embodiment.

FIG. 5 is a diagram illustrating an operation of a process of sharing content on an instant messaging application operating in a user terminal according to an example embodiment. The user account of the instant messaging application may enter the chat room of the instant messaging application to share the content. According to an example embodiment, the user account may enter one of a plurality of chat rooms already associated with the user account. For example, as illustrated in the first operation 500, when the user account executes the instant messaging application, a list 502 listing a chat room X, a chat room Y, and a chat room Z that are already associated may be displayed. Then, the user account may enter the chat room X by a touch input on an area 504 corresponding to the chat room X among the displayed chat rooms. According to another example embodiment, the user account may enter a chat room not associated with the user account, and may be associated with the chat room at the same time as entering the chat room. For example, the user account may select one or more other user accounts to generate a new chat room, and enter the generated new chat room. As another example, the user account may be invited to a chat room not associated with the user account, and so the user account may enter the invited chat room.

Before the user account enters the chat room, it may be automatically determined whether the content-to-be-shared exists. According to an example embodiment, as illustrated in the first operation 500, it may be determined whether the content-to-be-shared associated with the user account and/or the chat room X at any time exists before the user account enters the chat room X. For example, as soon as the user account touches the area 504 corresponding to the chat room X, it may be determined whether the content-to-be-shared for the chat room X exists. As another example, while the user account is associated with the chat room X, it may be determined whether the content-to-be-shared for the chat room X exists.

When it is determined that the content-to-be-shared exists and the user account enters the chat room, a share recommendation message may be output through the chat room. According to an example embodiment, as illustrated in the second operation 520, when the user account enters the chat room X 522, a share recommendation message 524 for the user account may be displayed on the display. This share recommendation message 524 may be displayed only in the chat room X 522 of the user account, and may not be displayed for other user accounts in the chat room. In some example embodiments, the share recommendation message may be displayed on all displays associated with at least some user accounts in the chat room, and may include information on which user account the content-to-be-shared is associated with.

The share recommendation message may include information on the content-to-be-shared and/or an interface for a share response. According to an example embodiment, when it is determined that video content is stored in the user terminal of the user account within a desired (or alternatively, predetermined) period and when the user account enters the chat room X, the share recommendation message may include information indicating the video content (e.g., a thumbnail image or a title of the video content). Further, the share recommendation message may include an area corresponding to "Share" and an area corresponding to "Cancel" as the interface for a share response from the user account. When the user account selects the area corresponding to "Share," the video content may be played for a plurality of user accounts in the chat room. When the user account selects the area corresponding to "Cancel", the video content may not be shared in the chat room.

Figure 6:
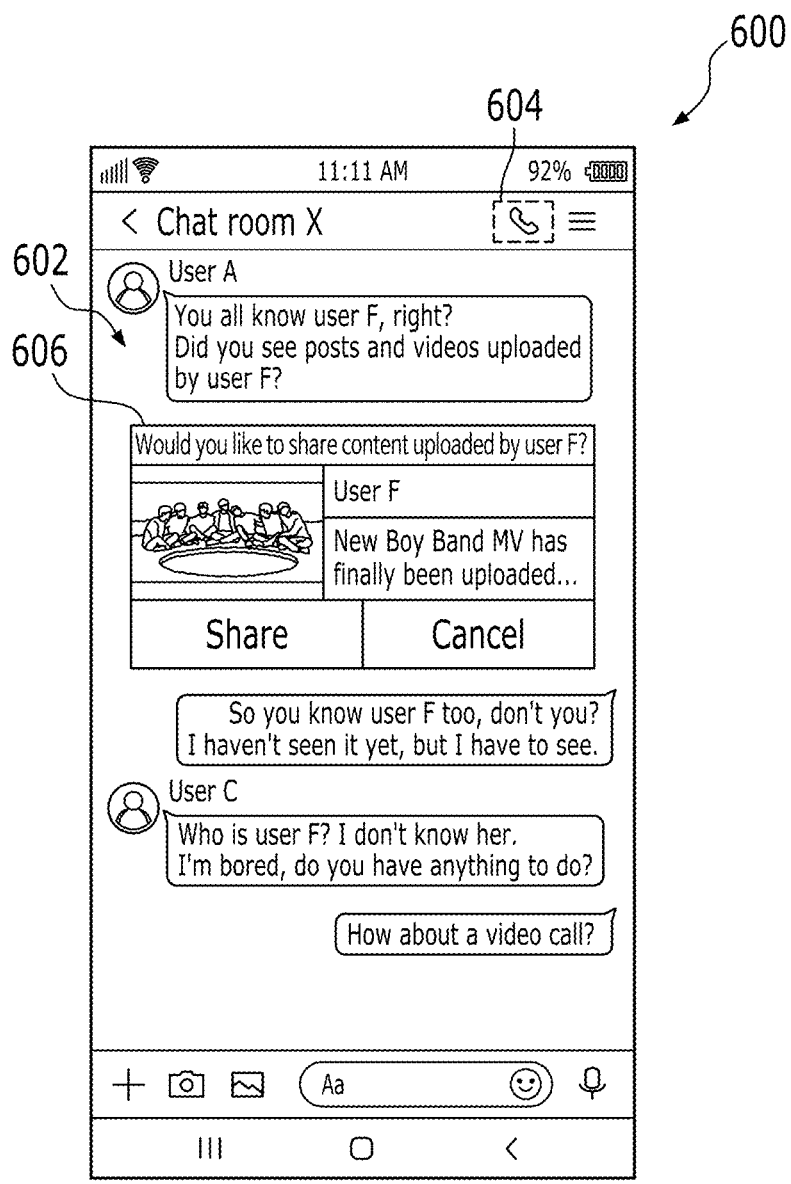
FIG. 6 is a diagram illustrating an operation of a process of sharing content on an instant messaging application operating in a user terminal according to another example embodiment of the present disclosure.

FIG. 6 is a diagram illustrating an operation of a process of sharing content on the instant messaging application operating in the user terminal according to another example embodiment of the present disclosure. A video call may be initiated between a plurality of user accounts associated with the chat room through the chat room of the instant messaging application. As illustrated, a video call between a plurality of user accounts associated with the chat room 602 may be initiated by a touch input of the user account with respect to an icon 604 corresponding to the video call.

Whether the content-to-be-shared exists may be automatically determined before the video call is initiated. According to an example embodiment, it may be determined whether the content-to-be-shared exists, at any point in time before the user account performs any action (e.g., a touch input or the like on the icon for the video call) for initiating a video call on the chat room. For example, the content sharing system providing the instant messaging service may determine whether the content-to-be-shared for the chat room associated with the user account exists. As still another example, the user terminal of the user account may determine whether the content-to-be-shared exists based on the user activity information of the user terminal. In this case, the user activity information of the user terminal may include not only the activity information associated with the instant messaging application, but also any activity information in the user terminal.

According to an example embodiment, in order to determine whether the content-to-be-shared exists, the content sharing system may analyze the content uploaded by one or more user accounts that are associated with at least some of a plurality of user accounts associated with the chat room, in the social network application associated with the instant messaging application. For example, when the user account and a user account A of the user terminal are included in the chat room X and both are associated or linked (e.g., registered as a friend) with a user account F, and when content has uploaded by the user account F in the social network application associated with the instant messaging application, it may be determined that the content-to-be-shared for the chat room exists. As still another example, when the user account F, which is registered as the friend of both the user account of the user terminal and the user account A associated with the chat room X, has uploaded content and only the user account performs an action in favor, such as marking likes or favorite, it may be determined that the content-to-be-shared for the chat room exists. In both cases, a share recommendation message for the user account of the user terminal may be output in the chat room X. Further, the share recommendation message may include information indicating or characterizing the content uploaded by the user account F.

When a video call is initiated through the chat room of the instant messaging application and it is determined that the content-to-be-shared exists, a share recommendation message for the user account may be output through the chat room. According to an example embodiment, when an input to initiate a video call is received from the user account and it is determined that the content-to-be-shared exists, a share recommendation message for the user account may be output through the chat room. For example, after the input to initiate a video call is received from the user account, a share recommendation message for the user account may be output through the chat room before the video call is sent. As illustrated in operation 600, after the input to initiate a video call is received by a touch input of the user account with respect to an icon 604 corresponding to the video call, and before the video call is sent to a plurality of user accounts, a share recommendation message 606 may be output through the chat room 602. FIG. 6 illustrates that the share recommendation message 606 is output before the video call is sent, but example embodiments are not limited thereto, and the share recommendation message may be output at any time after the video call is initiated.

Figure 7:
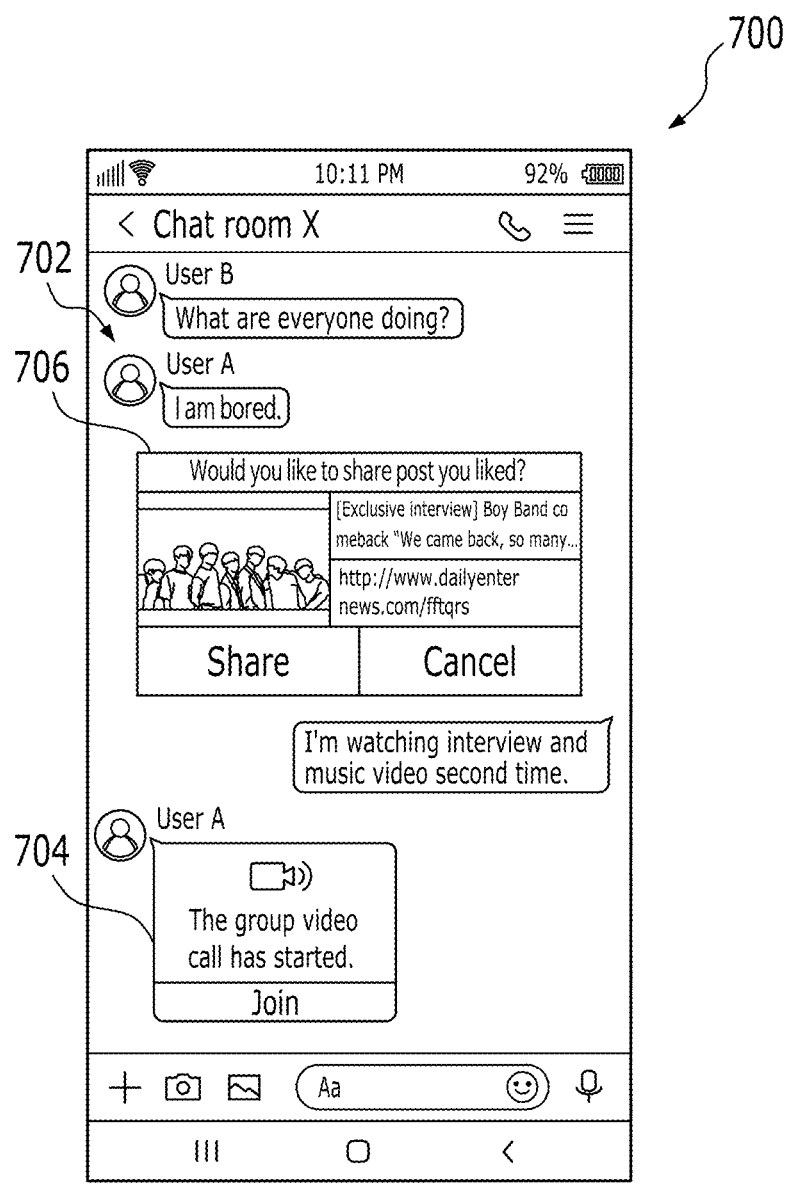
FIG. 7 is a diagram illustrating an operation of a process of sharing content on an instant messaging application operating in a user terminal according to still another example embodiment of the present disclosure.

FIG. 7 is a diagram illustrating an operation of a process of sharing content on the instant messaging application operating in the user terminal according to still another example embodiment of the present disclosure. It may be determined whether the user account of the user terminal receives a video call between a plurality of user accounts associated with the chat room through the chat room of the instant messaging application. For example, as illustrated in operation 700, a video call is initiated from the user account A associated with the chat room 702, and a notification message 704 for the video call may be provided through the chat room 702. In this case, the user account of the user terminal may determine whether to receive the video call initiated by the user account A by performing a touch input on an area corresponding to "Join" included in the notification message 704.

It may be determined whether the content-to-be-shared exists based on the activity information associated with the user account in the content providing application associated with the instant messaging application at any time before the reception of the video call on the chat room is determined. For example, it may be determined whether the content-to-be-shared exists based on a post that the user account has expressed a positive emotion or favor with "Like" in an application associated with the instant messaging application. To this end, it may be determined whether the content is included in the post that the user account has expressed a positive emotion or favor and/or whether or not the content included in the post is a shareable type of content.

When it is determined that the video call is to be received through the chat room and when it is determined that the content-to-be-shared exist, a share recommendation message for the user account may be output through the chat room. According to an example embodiment, when an input to determine to receive a video call is received from the user account and it is determined that the content-to-be-shared exist, a share recommendation message 706 for the user account may be output through the chat room 702. For example, after the input to determine to receive a video call is received from the user account, the share recommendation message 706 for the user account may be output through the chat room before the reception of the video call is performed.

As illustrated in FIG. 7, an input to determine to receive a video call may be received, by a touch input of the user account with respect to the area corresponding to "Join" included in the notification message 704 for the video call provided through the chat room 702. Then, before the reception of a video call is performed, the share recommendation message 706 may be output through the chat room 702. Further, the share recommendation message 706 may include text, video, image, link information, and the like of the post that the user account has expressed positive emotion or favor with "Like" in the application associated with the instant messaging application. FIG. 7 illustrates that the share recommendation message 706 is output before the video call is received, but example embodiments are not limited thereto, and the share recommendation message may be output at any time after the video call is received.

Figure 8:
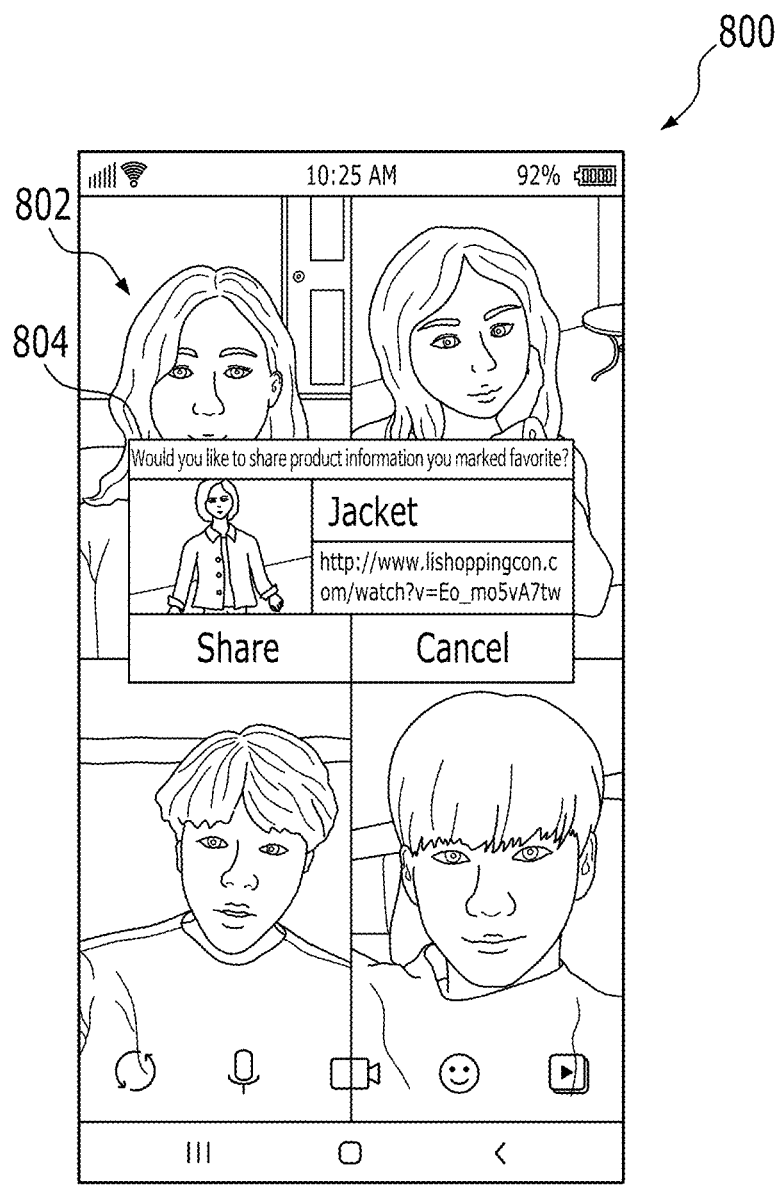
FIG. 8 is a diagram illustrating an operation of a process of sharing content on an instant messaging application operating in a user terminal according to still another example embodiment of the present disclosure.

FIG. 8 is a diagram illustrating an operation of a process of sharing content on an instant messaging application operating in a user terminal according to still another example embodiment of the present disclosure. As illustrated in operation 800, a screen for a video call between a plurality of user accounts associated with the chat room may be output through a chat room 802. In this example embodiment, a video call is being performed between four user accounts included in the chat room. In this case, the user account of the user terminal may be included in the four user accounts. Further, during a video call, an image or video representing four user accounts (e.g., a video obtained by capturing each user) may be shared through the chat room.

During a video call through the chat room, it may be automatically determined whether the content-to-be-shared exists. According to an example embodiment, the content sharing system may analyze activity information associated with the user account in a content providing application associated with the instant messaging application to determine whether the content-to-be-shared exists. Further, the content-to-be-shared may include not only image content and video content, but also product information, audio content, music information, and the like. For example, it may be determined whether the content-to-be-shared exists based on the "Jackets for spring" product that the user account has expressed positive emotion or favor by "favorite mark" function in the shopping application associated with the instant messaging application.

When it is determined that the content-to-be-shared is generated, a share recommendation message indicating whether to share the content-to-be-shared generated on the screen for the video call may be output. According to an example embodiment, as illustrated in operation 800, a share recommendation message 804 may be output on a video call screen through the chat room 802. For example, the share recommendation message 804 may include the name of the "Jackets for spring" that the user account has marked positive emotion, link information enabling access to such product information, and thumbnail information. Further, the share recommendation message 804 may include an interface (areas corresponding to "Share" and "Cancel") for determining from the user account whether to share.

Figure 9:
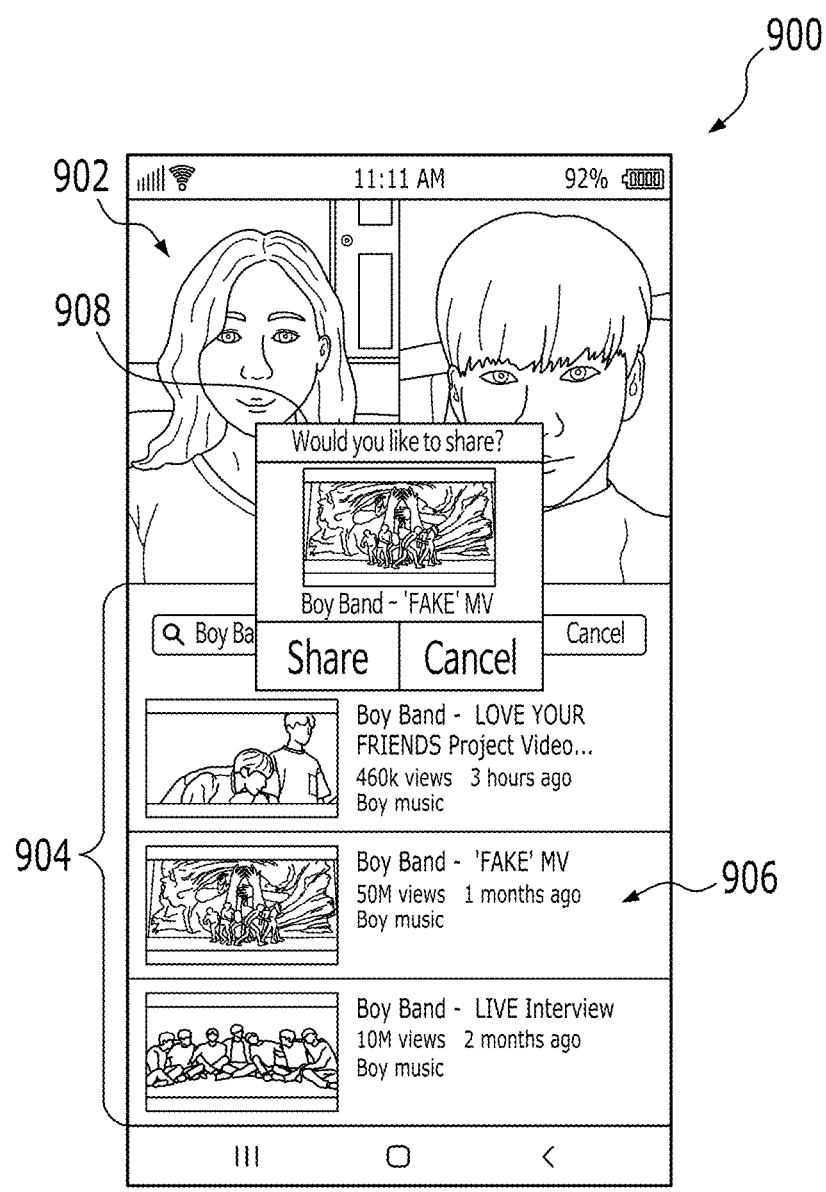
FIG. 9 is a diagram illustrating an operation of a process of sharing content on an instant messaging application operating in a user terminal according to still another example embodiment of the present disclosure.

FIG. 9 is a diagram illustrating an operation of a process of sharing content on the instant messaging application operating in the user terminal according to still another example embodiment of the present disclosure. According to an example embodiment, when it is determined that the content-to-be-shared is generated during a video call, a share recommendation message may be output, indicating whether to share the content-to-be-shared generated on the screen for the video call. For example, when it is determined that content is newly stored or generated during a video call between a plurality of user accounts associated with the chat room, a share recommendation message may be output, indicating whether to share the newly stored or generated content on the screen for the video call. As another example, as illustrated in operation 900, during a video call between a plurality of user accounts associated with the chat room 902, a plurality of contents 904 may be searched through a search engine associated with the chat room 902, and one content 906 may be selected from among the plurality of searched contents. In this case, it may be determined whether the selected content 906 corresponds to a shareable type of content. When the selected content 906 corresponds to a shareable type of content, a share recommendation message 908 indicating whether to share the selected content 906 may be output on the screen for a video call.

Figure 10:
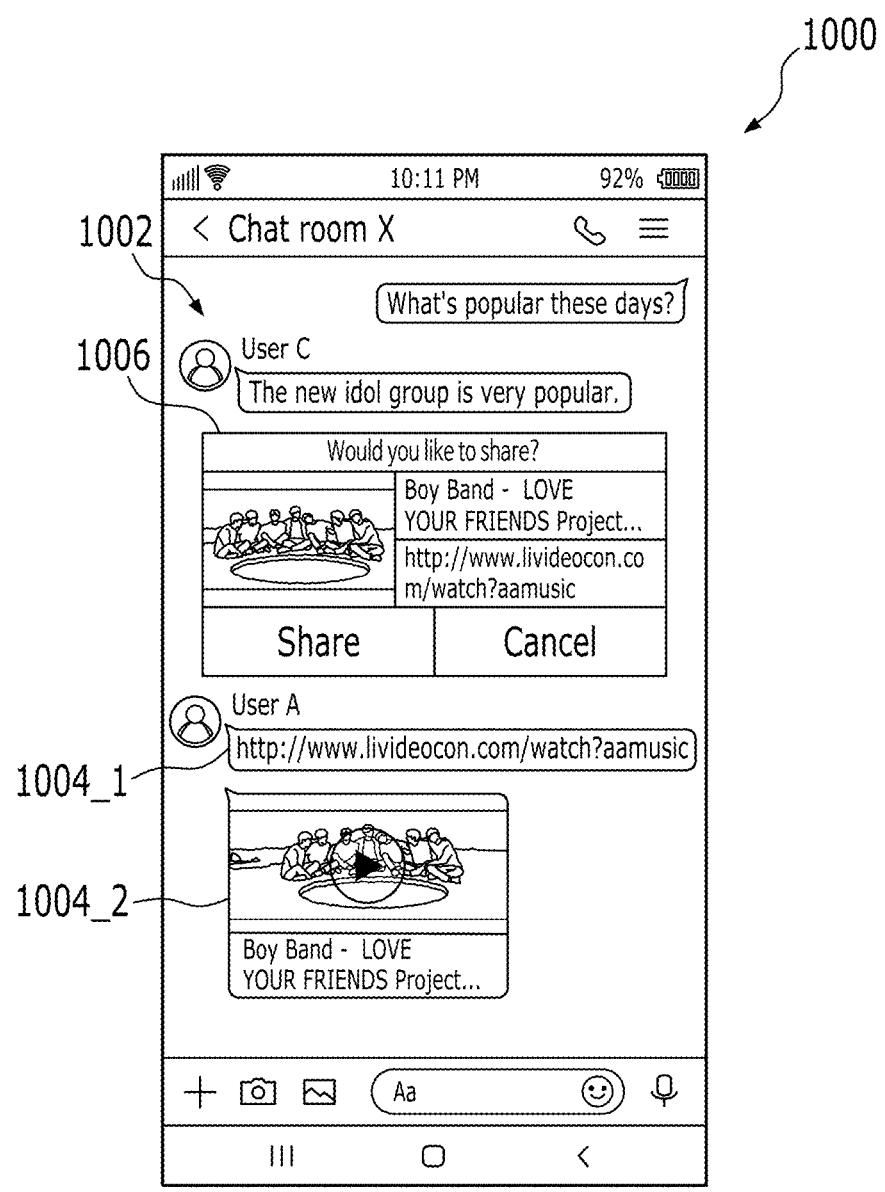
FIG. 10 is a diagram illustrating an operation of a process of sharing content on an instant messaging application operating in a user terminal according to still another example embodiment of the present disclosure.

FIG. 10 is a diagram illustrating an operation of a process of sharing content on the instant messaging application operating in the user terminal according to still another example embodiment of the present disclosure. When the user account selects one of the contents displayed in the chat room, it may be determined whether the selected content is a shareable type of content. When it is determined that the selected content is a shareable type of content, a share recommendation message for the user account may be output through the chat room. Based on the response of the user account to the share recommendation message outputted, the selected content may be displayed together with the screen for the video call between a plurality of user accounts included in the chat room.

According to an example embodiment, as illustrated in operation 1000, when the user account of the user terminal selects link information 1004_1 included in the message provided by the user account A through a chat room 1002, or selects video content 1004_2 associated with the link information, it may be determined whether the video content 1004_2 associated with the link information is a shareable type of content. When it is determined that the video content 1004_2 associated with the link information is a shareable type of content, a share recommendation message 1006 for the user account may be output through the chat room 1002. When the user account selects "Share" in response to the output share recommendation message, the video content associated with the link information may be displayed together with the screen for the video call between a plurality of user accounts included in the chat room.

Figure 11:
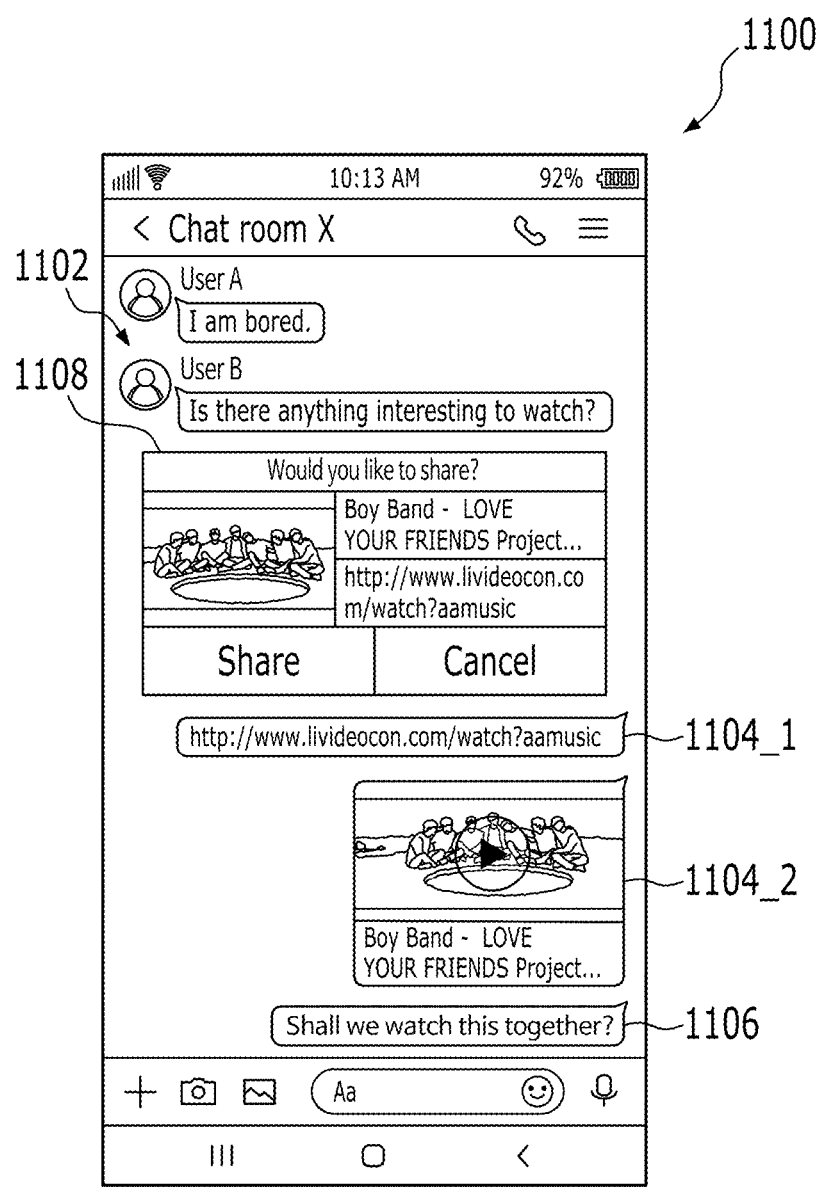
FIG. 11 is a diagram illustrating an operation of a process of sharing content on an instant messaging application operating in a user terminal according to still another example embodiment of the present disclosure.

FIG. 11 is a diagram illustrating an operation of a process of sharing content on the instant messaging application operating in the user terminal according to still another example embodiment of the present disclosure. According to an example embodiment, in order to determine whether the content-to-be-shared exist, it may be determined whether a shareable type of content and/or link information associated with such content is included in a message provided through the chat room. For example, a shareable type of content may refer to video content. When it is determined that the video content and/or the link information associated with the video content is included in the message provided through the chat room, the text information provided through the chat room may be analyzed, and a share recommendation message for the user account may be output through the chat room. For example, when the message provided from the user account of the user terminal contains text from which the intent of the user account to share the content-to-be-shared for the chat room is recognizable, a share recommendation message for the user account may be displayed through the chat room.

As illustrated in operation 1100, it may be determined whether link information 1104_1 associated with the video content is included in the message provided through the chat room 1102 from the user account, and it may be determined whether video content 1104_2 associated with the link information is a shareable type of content. That is, it may be determined that the link information 1104_1 associated with the video content is included in the message provided by the user account through the chat room 1102, and the video content 1104_2 associated with the link information may be determined as a shareable type of content. In this case, the text information of "Shall we watch this?" 1106 included in the message described next to the link information 1104_1 by the user account through the chat room 1102 may be analyzed such that a share recommendation message 1108 for the user account may be output through the chat room 1102. Further, the share recommendation message 1108 may include any information indicating the video content 1104_2 associated with the link information. While FIG. 11 illustrates that the text that induces the output of the share recommendation message is described next to the link information, example embodiments are not limited thereto, and such text may be described before the link information, or may be included within a desired (or alternatively, predetermined) range near the link information.

The above-described content sharing method may be implemented as a computer-readable code on a computer-readable recording medium. The computer-readable recording medium includes all kinds of recording devices in which data readable by a computer system is stored. Examples of computer-readable recording medium include ROM, RAM, CD-ROM, magnetic tape, floppy disks, and optical data storage devices, and the like. In addition, the computer-readable recording medium may be distributed over network coupled computer systems so that the computer-readable code is stored and executed in a distributed manner. Further, programmers in the technical field pertinent to the present disclosure will be easily able to envision functional programs, codes and code segments to implement the example embodiments.

The methods, operations, or techniques of this disclosure may be implemented by various means. For example, these techniques may be implemented in hardware, firmware, software, or a combination thereof. Those skilled in the art will further appreciate that the various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the disclosure, computer, or a combination thereof.

Accordingly, various example logic blocks, modules, and circuits described in connection with the disclosure may be implemented or performed with general purpose processors, DSPs, ASICs, FPGAs or other programmable logic devices, discrete gate or transistor logic, discrete hardware components, or any combination of those designed to perform the functions described herein. The general-purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, and the like. The instructions may be executable by one or more processors, and may cause the processor(s) to perform certain aspects of the functions described in the present disclosure.

When implemented in software, the techniques may be stored on a computer-readable medium as one or more instructions or codes, or may be transmitted through a computer-readable medium. The computer-readable media include both the computer storage media and the communication media including any medium that facilitates the transfer of a computer program from one place to another. The storage media may also be any available media that may be accessed by a computer. By way of non-limiting example, such a computer-readable medium may include RAM, ROM, EEPROM, CD-ROM or other optical disk storage, magnetic disk storage or other magnetic storage devices, or any other media that can be used to transfer or store desired program code in the form of instructions or data structures and can be accessed by a computer. Also, any connection is properly referred to as a computer-readable medium.

For example, when the software is transmitted from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer-readable media.

The software module may reside in, RAM memory, flash memory, ROM memory, EPROM memory, EEPROM memory, registers, hard disk, removable disk, CD-ROM, or any other form of storage medium known. An example storage medium may be connected to the processor, such that the processor may read or write information from or to the storage medium. In some example embodiments, the storage medium may be integrated into the processor. The processor and the storage medium may exist in the ASIC. The ASIC may exist in the user terminal. In some example embodiments, the processor and storage medium may exist as separate components in the user terminal.

Although the example embodiments described above have been described as utilizing aspects of the currently disclosed subject matter in one or more standalone computer systems, the present disclosure is not limited thereto, and may be implemented in conjunction with any computing environment, such as a network or distributed computing environment. Furthermore, aspects of the subject matter in this disclosure may be implemented in multiple processing chips or devices, and storage may be similarly influenced across a plurality of devices. Such devices may include PCs, network servers, and portable devices.

According to the example embodiments, the users do not need to load content-to-be-shared from outside a chat room and do not have to directly find content they want to share among various contents for sharing the content. Thus, computing time and resources of user terminals associated with the users for sharing the content may be reduced Although the present disclosure has been described in connection with some example embodiments herein, various modifications and changes can be made without departing from the scope of the present disclosure, which can be understood by those skilled in the art to which the present disclosure pertains. Further, such modifications and changes are intended to fall within the scope of the claims appended herein.

What is claimed is:

1. A method for sharing content through an instant messaging application operating on a user terminal, the method comprising:

cause, by at least one processor included in the user terminal, a server configured to provide the instant messaging application to perform at least one of (1) analyzing content uploaded by one or more user accounts that are associated with at least some user accounts of a plurality of user accounts associated with a chat room, in a social network application associated with the instant messaging application, (2) analyzing activity information associated with a user account in a content providing application associated with the instant messaging application, the activity information including expression of a positive emotion or favor with regard to posted content, or (3) determining whether a URL address is stored in a clipboard of the server;

first determining, by at least one processor included in the user terminal, whether content-to-be-shared for the chat room associated with the user account of the instant messaging application exists based on a result of the performing;

first outputting, by the at least one processor included in the user terminal, a share recommendation message for the user account through the chat room in response to a result of the first determining indicating that the content-to-be-shared exists;

receiving, by at least one processor included in the user terminal, a response to the share recommendation message from the user account; and second outputting, by at least one processor included in the user terminal, the content-to-be-shared for the chat room based on the received response to the share recommendation message.

2. The method according to claim 1, wherein the second outputting includes:
initiating a video call between the plurality of user accounts associated with the chat room through the chat room; and
outputting the content-to-be-shared together with a screen for the video call.

3. The method according to claim 1, wherein
the first determining includes automatically determining whether the content-to-be-shared exists before entering the user account into the chat room, and
the first outputting includes outputting the share recommendation message for the user account through the chat room in response to the user account entering the chat room and the result of the first determining indicating that the content-to-be-shared exists.

4. The method according to claim 1, wherein the first outputting includes:
initiating a video call between the plurality of user accounts associated with the chat room through the chat room; and
outputting the share recommendation message for the user account through the chat room in response to the video call through the chat room being initiated and the result of the first determining indicating that the content-to-be-shared exists.

5. The method according to claim 1, wherein the first outputting includes:
second determining whether to receive a video call between the plurality of user accounts associated with the chat room through the chat room; and
outputting the share recommendation message for the user account through the chat room in response to a result of the second determining indicating to receive the video call and the result of the first determining indicating that the content-to-be-shared exists.

6. The method according to claim 1, wherein
the first determining includes,
outputting a screen for a video call between the plurality of user accounts associated with the chat room through the chat room, and
automatically determining whether the content-to-be-shared is generated during the video call through the chat room, and
the first outputting includes outputting the share recommendation message indicating whether to share the generated content-to-be-shared on the screen for the video call in response to a result of the automatically determining indicating that the content-to-be-shared is generated.

7. The method according to claim 1, wherein
the first determining includes second determining whether link information associated with a shareable type of content in the user terminal exists, and
the second outputting includes outputting the shareable type of content through the link information.

8. The method according to claim 7, wherein
the second determining includes
determining whether the stored URL address is associated with video content, in response to a result of the determining indicating that the URL address is stored in the clipboard of the user terminal, and
the second outputting includes outputting the video content through the stored URL address.

9. The method according to claim 7, wherein
the second determining includes determining whether link information associated with video content stored in the user terminal exists, within a period of time, and
the second outputting includes outputting the video content through the link information.

10. The method according to claim 1, wherein
the first determining includes determining whether video content stored in the user terminal exists, within a period of time, and
the second outputting includes outputting the video content.

11. The method according to claim 1, wherein
the first determining includes,
selecting, by the user account, one of contents displayed in the chat room, and
second determining whether the selected one of the contents is a shareable type of content,
the first outputting includes outputting the share recommendation message for the user account through the chat room in response to a result of the second determining indicating that the selected one of the contents is the shareable type of content, and
the second outputting includes outputting the selected one of the contents together with a screen for a video call between the plurality of user accounts included in the chat room.

12. The method according to claim 1, wherein the first determining includes determining whether link information associated with video content is included in a message provided through the chat room.

13. The method according to claim 12, wherein the first outputting further includes analyzing text information provided through the chat room to output the share recommendation message for the user account through the chat room.

14. The method according to claim 1, wherein
the first determining is performed based on content provided through one or more chat rooms including the at least some user accounts among the plurality of user accounts associated with the chat room, and
the at least some user accounts include the user account.

15. The method according to claim 1, wherein
the at least some user accounts include the user account.

16. The method according to claim 1, wherein the receiving includes:
receiving an input to share the content-to-be-shared by the user account in the chat room; and
sharing the content-to-be-shared with the plurality of user accounts associated with the chat room through the chat room.

17. A non-transitory computer-readable recording medium storing instructions that, when executed by at least one processor, cause a user terminal including the at least one processor to implement the method according to claim 1.

18. A system for sharing content, comprising:
a memory; and
one or more processors connected to the memory and configured to execute computer-readable instructions contained in the memory such that the one or more processors are configured to cause the system to,
perform at least one of (1) analyzing content uploaded by one or more user accounts that are associated with at least some user accounts of a plurality of user accounts associated with a chat room, in a social network application associated with an instant messaging application, (2) analyzing activity information associated with a user account in a content providing application associated with the instant messaging application, the activity information including expression of a positive emotion or favor with regard to posted content, or (3) determining whether a URL address is stored in a clipboard of the system,
determine whether content-to-be-shared for the chat room associated with the user account of the instant messaging application exists based on a result of the performance,
output a share recommendation message for the user account through the chat room in response to a determination result indicating that the content-to-be-shared exists,
receive a response to the share recommendation message from the user account, and
output the content-to-be-shared for the chat room based on the received response to the share recommendation message.

19. The system according to claim 18, wherein the one or more processors are further configured to initiate a video call between the plurality of user accounts associated with the chat room through the chat room, based on the received response to the share recommendation message, and output the content-to-be-shared together with a screen for the video call.

* * * * *